United States Patent
Cho et al.

(10) Patent No.: US 11,584,355 B2
(45) Date of Patent: Feb. 21, 2023

(54) HYBRID ELECTRIC VEHICLE AND METHOD OF CONTROLLING THE SAME

(71) Applicants: HYUNDAI MOTOR COMPANY, Seoul (KR); KIA MOTORS CORPORATION, Seoul (KR)

(72) Inventors: Jin Kyeom Cho, Suwon-si (KR); Hui Un Son, Suwon-si (KR); Gyu Ri Lee, Namyangju-si (KR); Sung Bae Jeon, Ansan-si (KR); Sung Jae Oh, Goyang-si (KR); Myung Woo Kim, Hwaseong-si (KR); Yeon Bok Kim, Seongnam-si (KR); Yeong Jin Cho, Mokpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 158 days.

(21) Appl. No.: 17/112,039

(22) Filed: Dec. 4, 2020

(65) Prior Publication Data

US 2022/0009476 A1    Jan. 13, 2022

(30) Foreign Application Priority Data

Jul. 9, 2020  (KR) .......................... 10-2020-0084880

(51) Int. Cl.
*B60W 10/08* (2006.01)
*B60W 20/13* (2016.01)
(Continued)

(52) U.S. Cl.
CPC ............... *B60W 20/13* (2016.01); *B60K 6/26* (2013.01); *B60K 6/387* (2013.01); *B60W 10/02* (2013.01);
(Continued)

(58) Field of Classification Search
CPC ...... B60W 20/13; B60W 10/02; B60W 10/06; B60W 10/08; B60W 2710/021;
(Continued)

(56) References Cited

U.S. PATENT DOCUMENTS 10,093,166 B2 * 10/2018 Toyota .................. B60K 6/547
2009/0321153 A1 * 12/2009 Boeckenhoff ............ B60K 6/52
180/24.1

(Continued)

*Primary Examiner* — Roger L Pang
(74) *Attorney, Agent, or Firm* — Lempia Summerfield Katz LLC (57) ABSTRACT

Disclosed is a method of controlling a hybrid electric vehicle having a transmission, an engine, and first and second drive motors. The method includes: performing charging through the first drive motor using the power of the engine by engaging an engine clutch disposed between the engine and the first drive motor while a vehicle is stopped with the gear stage shifted to the parking (P) range; turning off the engine and controlling the clutch of the transmission to enter an open state when the gear stage is shifted to the driving (D) range; and commencing movement of the vehicle using the second drive motor alone or using at least one of the first drive motor or the engine together with the second drive motor based on at least one of requested torque, available torque of the second drive motor, or the speed of the first drive motor.

20 Claims, 6 Drawing Sheets

(51) Int. Cl.
  *B60K 6/26* (2007.10)
  *B60K 6/387* (2007.10)
  *B60W 10/02* (2006.01)
  *B60W 10/06* (2006.01)
  *B60W 10/10* (2012.01)
  *B60W 20/40* (2016.01)
  *B60W 30/18* (2012.01)
(52) U.S. Cl.
  CPC ............ *B60W 10/06* (2013.01); *B60W 10/08* (2013.01); *B60W 10/10* (2013.01); *B60W 20/40* (2013.01); *B60W 30/18027* (2013.01); *B60W 2510/081* (2013.01); *B60W 2510/244* (2013.01); *B60W 2520/04* (2013.01); *B60W 2540/10* (2013.01); *B60W 2540/16* (2013.01); *B60W 2710/021* (2013.01); *B60W 2710/025* (2013.01); *B60W 2710/0666* (2013.01); *B60W 2710/081* (2013.01); *B60W 2710/083* (2013.01); *B60Y 2200/92* (2013.01); *B60Y 2300/91* (2013.01)
(58) Field of Classification Search
  CPC ... B60W 2710/0666; B60W 2710/081; B60W 2710/086; B60W 2510/081; B60W 2510/244; B60W 2520/04; B60W 2520/10; B60W 2540/10; B60W 2540/16; B60W 10/115; B60W 10/10; B60W 20/40; B60W 30/18027; B60W 2710/06; B60W 2710/1005; B60K 17/354; B60Y 2300/91
  USPC ............................................................ 477/5
  See application file for complete search history.

(56) References Cited

U.S. PATENT DOCUMENTS

| | | | |
|---|---|---|---|
| 2013/0005529 A1* | 1/2013 | Chen ..................... | B60K 6/54 475/5 |
| 2013/0154576 A1* | 6/2013 | Shin ....................... | B60K 6/48 180/65.265 |
| 2015/0175032 A1* | 6/2015 | Nagamori ............... | B60L 50/16 701/22 |
| 2020/0269675 A1* | 8/2020 | Haka ...................... | F16H 3/728 |

* cited by examiner

HYBRID ELECTRIC VEHICLE AND METHOD OF CONTROLLING THE SAME

CROSS-REFERENCE TO RELATED APPLICATION

This application claims priority to and the benefit of Korean Patent Application No. 10-2020-0084880, filed on Jul. 9, 2020, the entire contents of which are incorporated herein by reference.

FIELD

The present disclosure relates to a hybrid electric vehicle and a method of controlling the same capable of providing improved drivability.

BACKGROUND

The statements in this section merely provide background information related to the present disclosure and may not constitute prior art.

Recently, with increased concern about the environment, environmentally friendly vehicles have been actively developed. As representative examples of environmentally friendly vehicles, electric vehicles (EVs) and hybrid electric vehicles (HEVs) have been developed.

In general, a hybrid electric vehicle (HEV) is a vehicle that uses two types of power sources: an engine and a motor. Compared with a vehicle equipped with only an internal combustion engine, the hybrid electric vehicle exhibits excellent fuel efficiency, improved power performance, and reduced emissions. Thus, hybrid electric vehicles have recently been actively developed.

Hybrid electric vehicles may operate in one of two driving modes depending on traveling conditions. One of the two driving modes is an electric vehicle (EV) mode, in which the hybrid electric vehicle travels using only an electric motor, and the other one thereof is an hybrid electric vehicle (HEV) mode, in which power is generated from an electric motor and an engine. While traveling, the hybrid electric vehicle switches between the two driving modes depending on the traveling conditions. In general, switching between the two driving modes is performed in order to maximize fuel efficiency or driving performance based on the efficiency characteristics of the powertrain.

Figure 1:
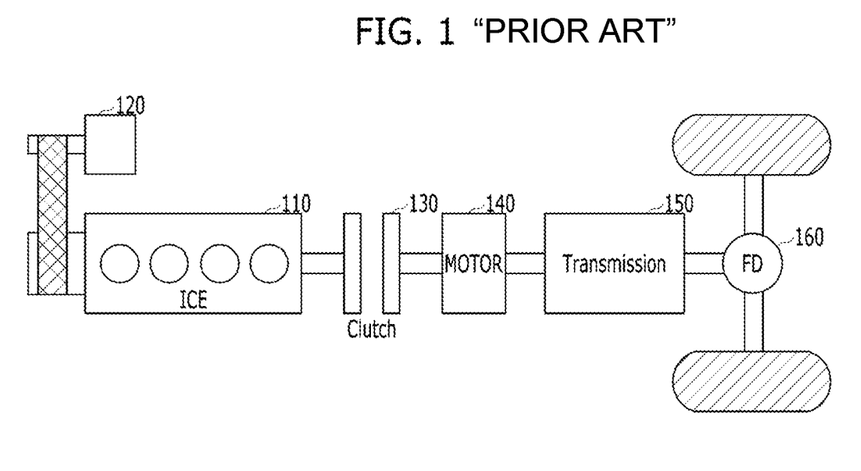
FIG. 1 shows an example of the structure of a powertrain of a conventional parallel-type hybrid electric vehicle.

FIG. 1 shows an example of the structure of a powertrain of a conventional hybrid electric vehicle.

FIG. 1 illustrates the structure of the powertrain of a hybrid electric vehicle equipped with a parallel-type or transmission-mounted-electric-drive (TMED)-type hybrid system.

Referring to FIG. 1, an electric motor (or a drive motor) 140 and an engine clutch (EC) 130 are disposed between an internal combustion engine (ICE) 110 and a transmission 150.

In such a vehicle, when a driver steps on an accelerator pedal after commencing movement of the vehicle, the motor 140 is first driven using the power of a battery in the state in which the engine clutch 130 is open, and then the power of the motor is transmitted to the wheels via the transmission 150 and a final drive (FD) 160 in order to rotate the wheels (i.e. the EV mode). When greater driving force is needed as the vehicle is accelerated, a starter/generator motor 120 may be operated so as to drive the engine 110.

When the rotational speeds of the engine 110 and the motor 140 become equal, the engine clutch 130 is locked, with the result that both the engine 110 and the motor 140, or only the engine 110, drives the vehicle (i.e. transition from the EV mode to the HEV mode). When a predetermined engine OFF condition is satisfied, for example, when the vehicle is decelerated, the engine clutch 130 is open, and the engine 110 is stopped (i.e. transition from the HEV mode to the EV mode). In addition, when the hybrid electric vehicle is braked, the driving force of the wheels is converted into electrical energy, and the battery is charged with the electrical energy, which is referred to as recovery of braking energy or regenerative braking.

The starter/generator motor 120 serves as a starter motor when the engine is started, and operates as a generator when the rotational energy of the engine is collected after the engine is started or when the engine is turned off. Therefore, the starter/generator motor 120 may alternatively be referred to as a "hybrid starter generator (HSG)", or may also be referred to as an "auxiliary motor" in some cases.

In the case of such a TMED system, when a high-voltage battery needs to be charged in the state in which the vehicle is stopped with the gear stage shifted to the parking range (P range), the engine clutch 130 is open and the engine 110 is started in order to charge the high-voltage battery through the HSG 120 using the power of the engine, or the engine clutch 130 is locked in order to charge the high-voltage battery using the motor 140.

However, when the HSG 120 is used to charge the high-voltage battery, charging efficiency decreases (by about 10%) compared with when the motor 140 is used. On the other hand, when the motor 140 is used to charge the high-voltage battery, drivability is degraded when the vehicle starts moving. This will be described below with reference to FIG. 2.

Figure 2:
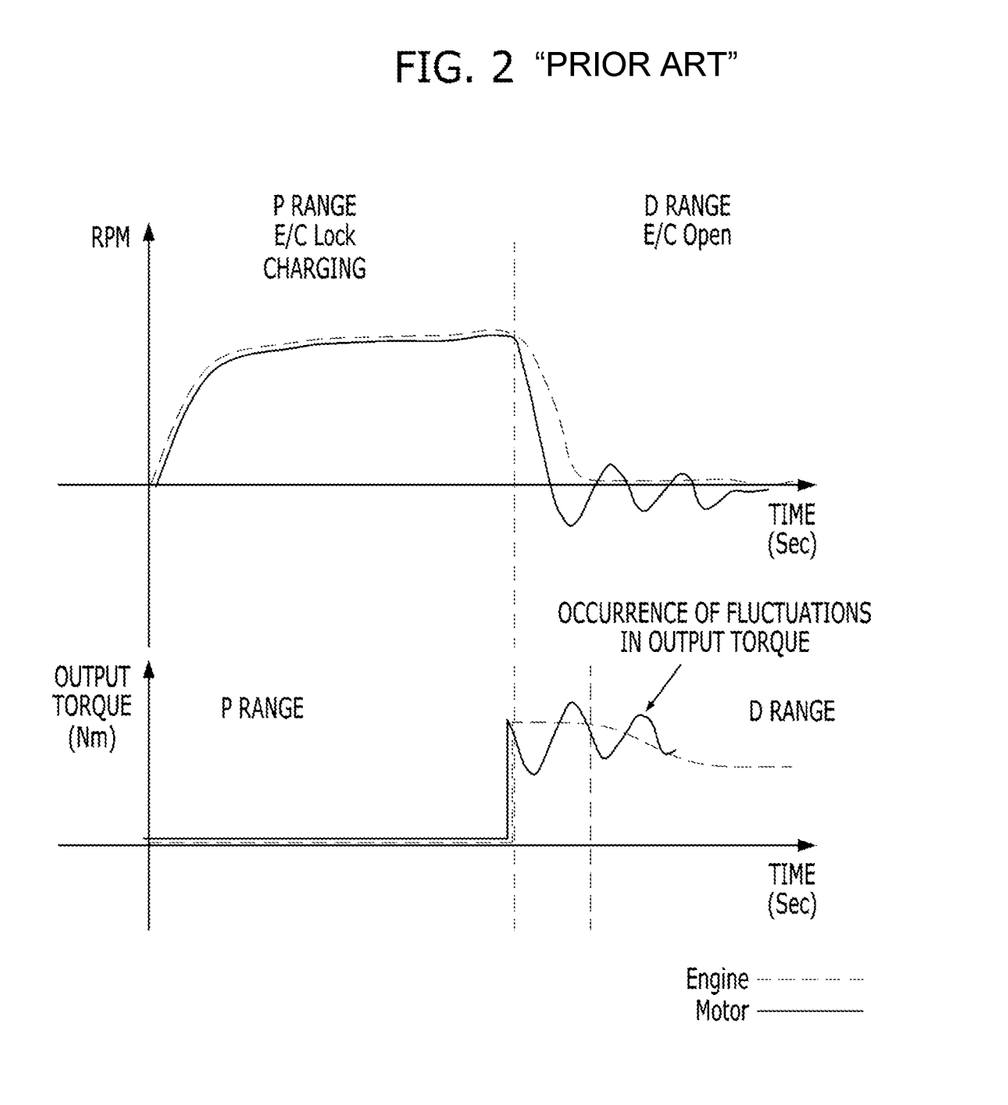
FIG. 2 shows graphs for explaining a problem occurring when a conventional parallel-type hybrid electric vehicle starts moving after charging is performed through a motor while the vehicle is stopped.

FIG. 2 shows graphs for explaining a problem occurring when a conventional parallel-type hybrid electric vehicle starts moving after charging is performed through a motor while the vehicle is stopped.

In FIG. 2, the upper graph represents the speeds of the engine 110 and the motor 140, and the lower graph represents the output torques of the engine 110 and the motor 140. The upper graph and the lower graph share the horizontal axis, which represents time, with each other.

Referring to FIG. 2, in the state in which the vehicle is stopped with the transmission 150 shifted to the P range, the engine is started, and then the engine clutch 130 is locked in order to perform charging through the motor 140. At this time, since the engine clutch 130 is in the locked state, the speeds of the engine 110 and the motor 140 are the same, and the engine 110 is controlled to be driven at a preset idle charging speed (e.g. 1200 RPM).

In this state, when the gear stage shifts to the driving range (D range) in order to move the vehicle, the engine clutch 130 is disengaged, and each of the engine 110, which rotates at the idle charging speed, and the motor 140 enters stop control. At this time, we have discovered that the speed of the engine 110 is quickly controlled to zero due to the relatively large inertia thereof, but the speed of the motor 140 is slowly controlled to zero due to the relatively small inertia thereof. This causes fluctuations in the output torque, thereby degrading drivability when the gear stage shifts to the D range and thus the vehicle starts moving.

SUMMARY

The present disclosure is directed to a hybrid electric vehicle and a method of controlling the same that substantially obviate one or more problems due to limitations and disadvantages of the related art.

The present disclosure provides a hybrid electric vehicle and a method of controlling the same capable of realizing higher charging efficiency while a vehicle is stopped and securing drivability when the vehicle starts moving.

However, the objects to be accomplished by the forms are not limited to the above-mentioned objects, and other objects not mentioned herein will be clearly understood by those skilled in the art to which the forms pertain from the following description.

In one form of the present disclosure, a method of controlling a hybrid electric vehicle having an engine and a first drive motor disposed on the front side of a transmission and further having a second drive motor configured to apply driving force independently of the first drive motor may include: performing charging through the first drive motor using the power of the engine by engaging an engine clutch disposed between the engine and the first drive motor while the hybrid electric vehicle is stopped with the gear stage shifted to the parking (P) range, turning off the engine and controlling the clutch of the transmission to enter an open state when the gear stage is shifted to the driving (D) range, and commencing movement of the hybrid electric vehicle using the second drive motor alone or using at least one of the first drive motor or the engine together with the second drive motor based on at least one of requested torque, available torque of the second drive motor, or the speed of the first drive motor.

In another form of the present disclosure, a hybrid electric vehicle may include: a transmission, an engine and a first drive motor disposed on the front side of the transmission, a second drive motor configured to apply driving force independently of the first drive motor, and a controller configured to perform charging through the first drive motor operated with the power of the engine by engaging an engine clutch disposed between the engine and the first drive motor while a vehicle is stopped with the gear stage shifted to the parking (P) range, to turn off the engine and control the clutch of the transmission to enter an open state when the gear stage is shifted to the driving (D) range, and to commence movement of the vehicle using the second drive motor alone or using at least one of the first drive motor or the engine together with the second drive motor based on at least one of requested torque, available torque of the second drive motor, or the speed of the first drive motor.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in detail with reference to the accompanying drawings so that those skilled in the art may easily carry out the forms. The present disclosure may, however, be embodied in many different forms, and should not be construed as being limited to the forms set forth herein. In the drawings, parts irrelevant to the description of the present disclosure will be omitted for clarity.

Throughout the specification, when a certain part "includes" or "comprises" a certain component, this indicates that other components are not excluded, and may be further included unless otherwise noted. The same reference numerals used throughout the specification refer to the same constituent elements.

Prior to describing a method of performing charging while a vehicle is stopped and controlling commencement of movement of a vehicle according to forms of the present disclosure, the structure and the control system of a hybrid electric vehicle to which forms are applicable will be described first.

Figure 3A:
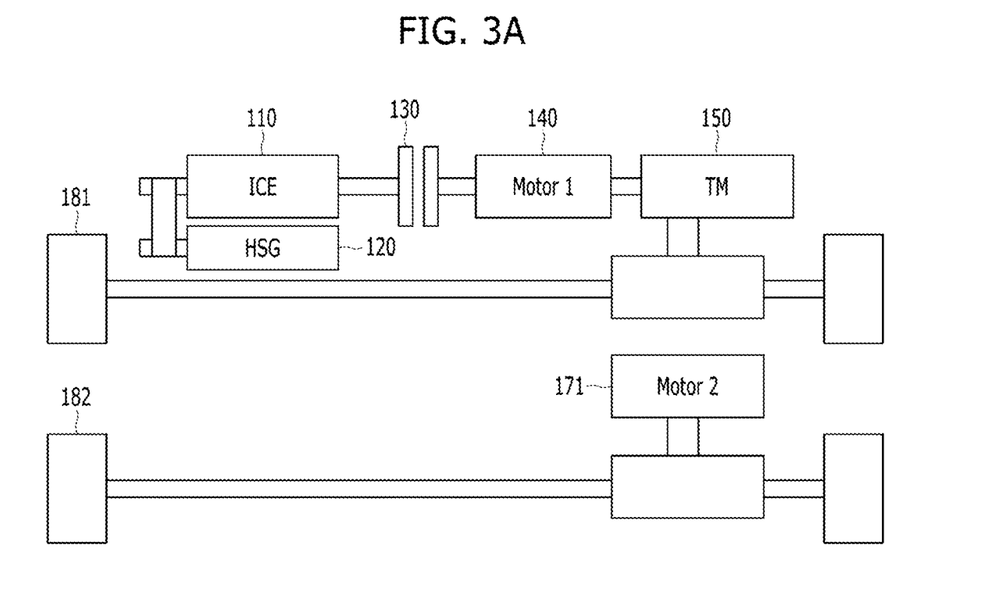
FIGS. 3A and 3B are diagrams for explaining the configuration of a powertrain of a hybrid electric vehicle to which forms of the present disclosure are applicable.
Figure 3B:
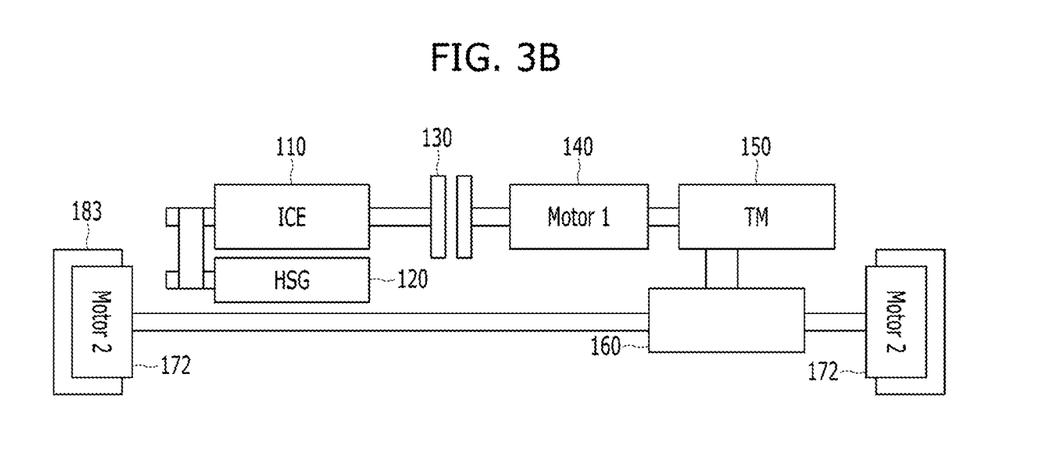

FIGS. 3A and 3B are diagrams for explaining the configuration of a powertrain of a hybrid electric vehicle to which exemplary forms of the present disclosure are applicable.

Among the constituent elements shown in each of FIGS. 3A and 3B, the constituent elements corresponding to those shown in FIG. 1 are denoted by the same reference numerals, and a duplicate description thereof will be omitted for simplicity of the specification. Differences from the configuration shown in FIG. 1 will be mainly described.

Referring to FIG. 3A, the configuration of a powertrain transmitting driving force to main driving wheels 181 is substantially the same as that shown in FIG. 1. However, compared with the configuration shown in FIG. 1, a separate motor 171 for transmitting driving force to auxiliary driving wheels 182 is additionally provided. Here, the main driving wheels 181 may be front wheels and the auxiliary driving wheels 182 may be rear wheels, without being limited thereto. This powertrain configuration is referred to as an electric 4-Wheel Drive (e4WD).

Next, referring to FIG. 3B, the configuration from the engine 110 to the final drive 160 is substantially the same as that shown in FIG. 1. However, an in-wheel motor 172 is additionally provided so as to be disposed at each of the main driving wheels 183.

The powertrain shown in FIG. 3A or 3B is provided with a separate motor 171 or 172, which may apply driving force to the vehicle independently of the motor 140. Hereinafter, for convenience of description, the motor 140 disposed on the input side of the transmission 150 will be referred to as a "first drive motor", and the motor 171 or 172 capable of applying driving force independently of the first drive motor 140 will be referred to as a "second drive motor".

Figure 4:
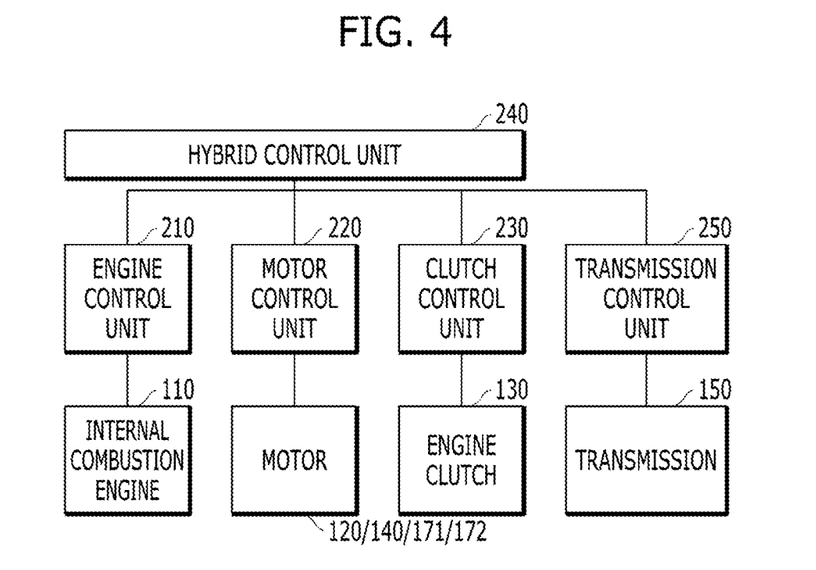
FIG. 4 is a block diagram showing an example of a control system of a hybrid electric vehicle to which forms of the present disclosure are applicable.

FIG. 4 is a block diagram showing an example of a control system of a hybrid electric vehicle to which forms of the present disclosure are applicable.

Referring to FIG. 4, in a hybrid electric vehicle to which forms of the present disclosure are applicable, the internal combustion engine 110 may be controlled by an engine control unit 210. The starter/generator motor 120, the first drive motor 140, and the second drive motor 171 or 172 may be controlled by a motor control unit (MCU) 220. The engine clutch 130 may be controlled by a clutch control unit 230. Here, the engine control unit 210 is referred to as an engine management system (EMS). In addition, the transmission 150 is controlled by a transmission control unit 250. In some cases, the motor control unit for controlling the starter/generator motor 120 and the motor control unit for controlling each of the first drive motor 140 and the second drive motor 171 or 172 may be provided separately from each other. In addition, when the engine clutch 130 is a normally-closed-type dry engine clutch, the clutch control unit 230 may include a hydrostatic clutch actuator (HCA).

Each of the control units may be connected to a hybrid control unit (HCU) 240, which is an upper-level control unit that controls the overall process of mode switching, and may provide information necessary for engine clutch control at the time of switching a driving mode or shifting gears and/or information necessary for engine stop control to the hybrid control unit 240, or may perform an operation in response to a control signal under the control of the hybrid control unit 240.

More specifically, the hybrid control unit 240 determines whether to perform mode switching depending on the traveling state of the vehicle. For example, the hybrid control unit may determine the state of the engine clutch 130 (lock-up, slip, open, etc.), may determine the time at which to disengage the engine clutch, and may control the time at which to stop injecting fuel into the engine 110. In addition, the hybrid control unit may transmit a torque command for controlling the torque of the starter/generator motor 120 to the motor control unit 220 in order to control stopping of the engine, thereby controlling recovery of the rotational energy of the engine. In addition, the hybrid control unit 240 may control the lower-level control units so as to determine the mode-switching condition and perform mode switching at the time of performing driving-mode-switching control.

Of course, it will be apparent to those skilled in the art that the connection relationships between the control units and the functions/division of the control units described above are merely illustrative and are not limited by the names thereof. For example, the hybrid control unit 240 may be implemented such that the function thereof is provided by any one of the control units other than the hybrid control unit 240 or such that the function thereof is distributed and provided by two or more of the other control units.

The following description of the forms will be made on the assumption that the forms are applied to a hybrid electric vehicle having the powertrain configuration shown in FIG. 3A or 3B and the control units shown in FIG. 4. However, this is for convenience of description, and it will be apparent to those skilled in the art that the structure of the vehicle according to the form may be changed within a range that remains compatible with the form.

Hereinafter, charging while a vehicle is stopped and control of commencement of movement of a vehicle according to forms of the present disclosure will be described based on the above-described configuration of the hybrid electric vehicle.

The form of the present disclosure proposes technology of performing charging through the first drive motor 140 using the power of the engine 110 when charging is desired while a vehicle is stopped with the transmission shifted to the P range and of selectively performing one of a plurality of starting modes depending on the state of the driving source and the requested torque when the gear stage shifts to the D range.

Figure 5:
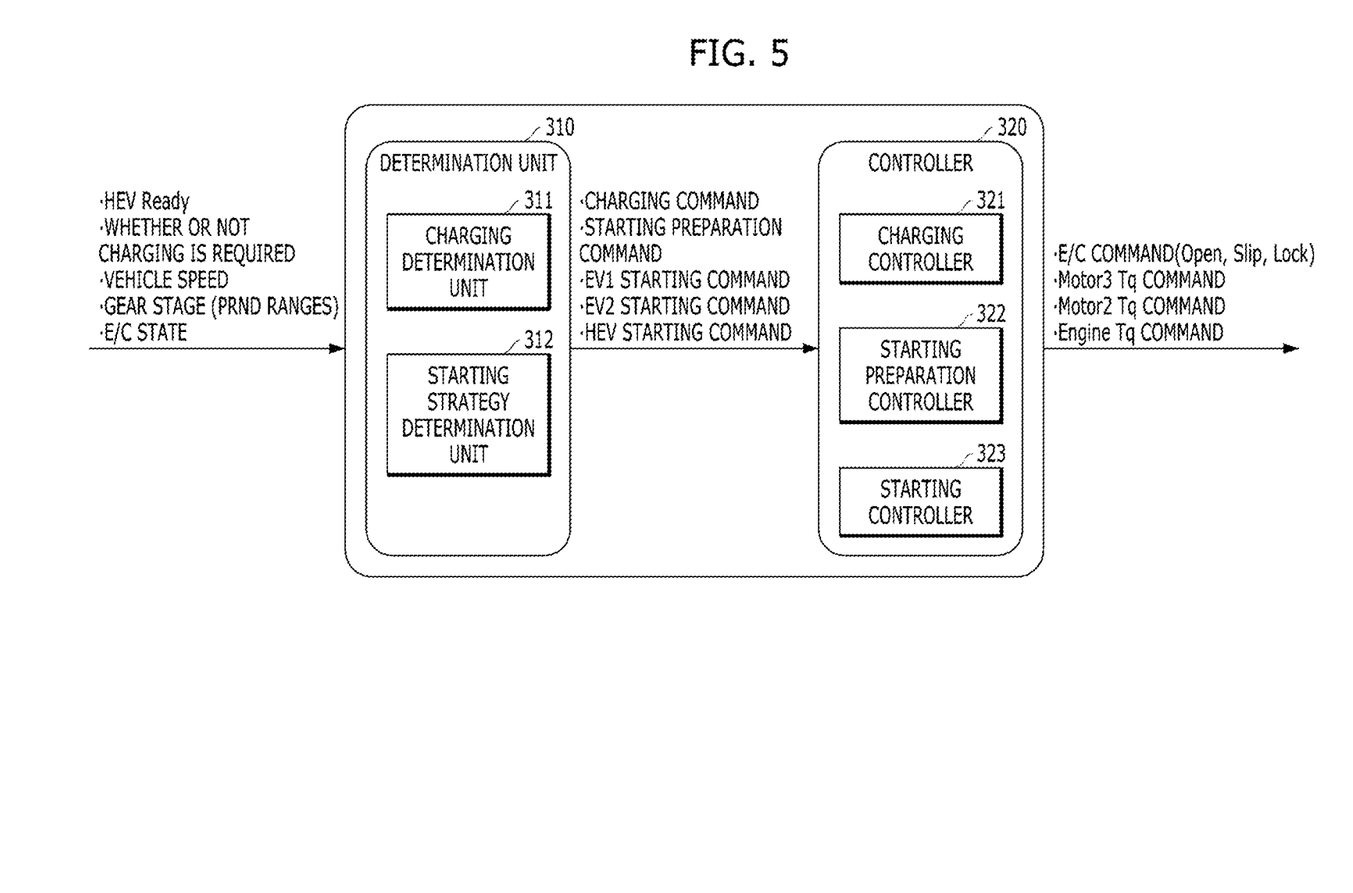
FIG. 5 shows an example of the configuration of a charging and starting control device according to one form of the present disclosure.

FIG. 5 shows an example of the configuration of a charging and starting control device according to one form of the present disclosure.

Referring to FIG. 5, the charging and starting control device 300 may include a determination unit 310 and a controller 320.

The determination unit 310 may include a charging determination unit 311, which determines whether to perform charging depending on the need for charging while the vehicle is stopped, and a starting strategy determination unit 312, which selects a starting mode depending on the state of the driving source and the requested torque when the vehicle starts moving.

In addition, the controller 320 may include a charging controller 321, which controls a charging process while the vehicle is stopped, a starting preparation controller 322, which performs control necessary for preparation of commencement of movement of the vehicle when the gear stage shifts to the D range, and a starting controller 323, which determines the output torque of each driving source depending on the starting mode.

In the form, the charging and starting control device 300 may be implemented as a constituent element or function of the hybrid control unit 240, or may be implemented as a control unit other than the hybrid control unit 240, among the control units shown in FIG. 4, or as a separate control unit.

Hereinafter, the operation of the components shown in FIG. 5 will be described in detail with reference to FIG. 6.

Figure 6:
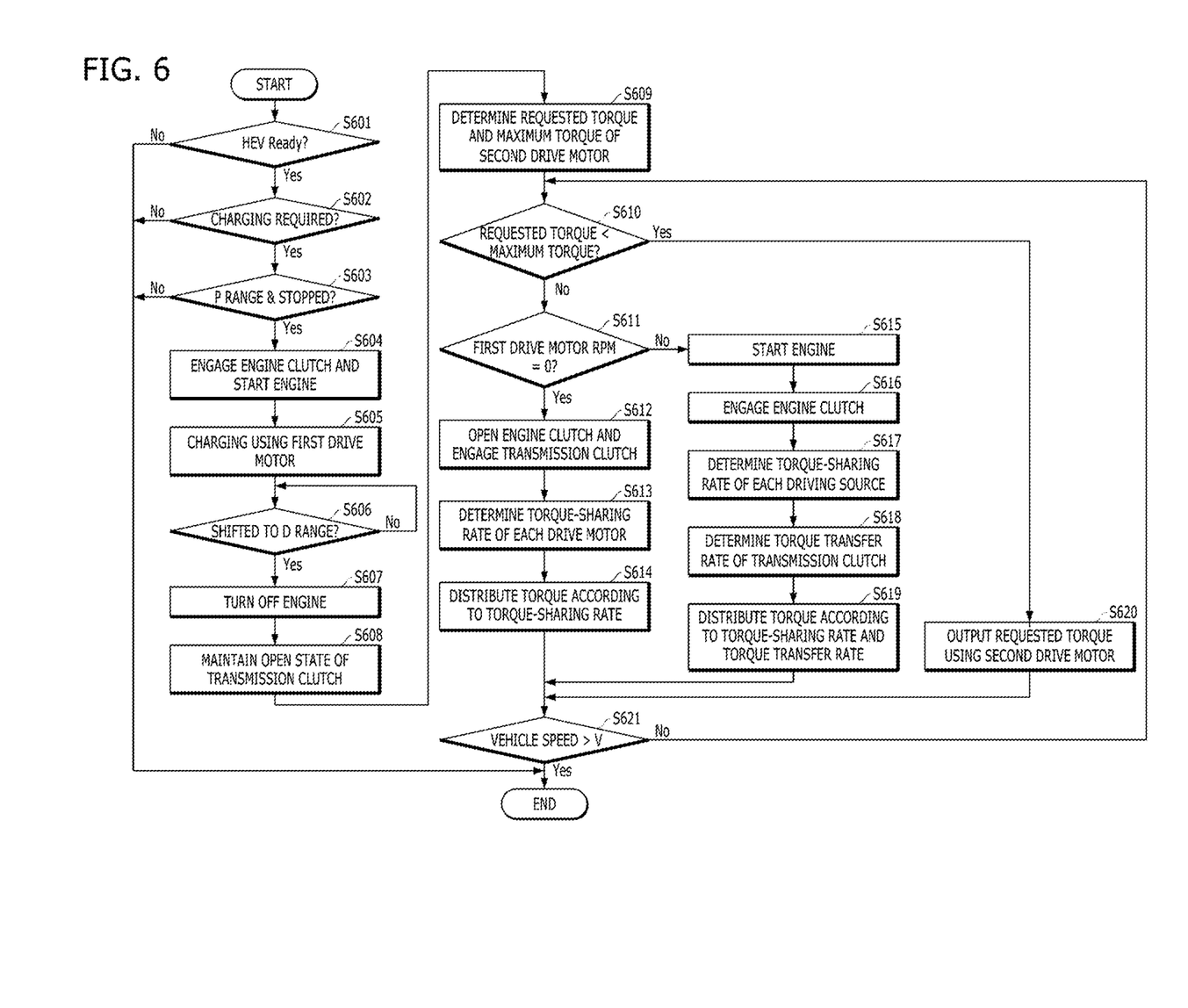
FIG. 6 is a flowchart showing an example of a control process for charging while a vehicle is stopped and for commencement of movement of the vehicle according to one form of the present disclosure.

FIG. 6 is a flowchart showing an example of a control process for charging while the vehicle is stopped and for commencement of movement of the vehicle according to one form of the present disclosure.

When the hybrid electric vehicle is ready for travel (i.e. HEV Ready, which corresponds to "IG on" of a general vehicle) (YES in S601) and when charging is desired (YES in S602), the charging determination unit 311 may determine whether the vehicle is in a stopped state with the gear stage shifted to the P range (S603). Here, the state in which charging is desired may include the case in which the state of charge (SOC) of at least one of a main battery or an auxiliary battery (e.g. a 12V battery) drops below a predetermined value and the case in which electrical energy is consumed by an electric load (e.g. an air conditioner, a heater, or a multimedia load), without being limited thereto. In one example, the case in which the driver operates the accelerator pedal while the vehicle is stopped may be recognized as a charging command.

In the state in which charging is desired, if the vehicle is in a stopped state with the gear stage shifted to the P range (YES in S603), the charging determination unit 311 transmits a charging command to the charging controller 321.

Accordingly, the charging controller 321 determines to start the engine 110 and lock the engine clutch 130, and outputs commands (instructions) corresponding thereto (S604). In addition, the charging controller 321 may perform control such that charging is performed through the first drive motor 140 using the power of the engine (S605). Here, the operation point (torque or RPM) of the engine 110 may be determined according to the efficiency characteristics of the engine.

While charging is being performed, if the driver selects the D range (Yes in S606), the starting strategy determination unit 312 transmits a starting preparation command to the starting preparation controller 322. Accordingly, the starting preparation controller 322 turns off the engine 110 (S607) and performs starting preparation control such that the clutch of the transmission 150 is controlled to be open (S608). Here, the reason why the clutch of the transmission 150 is open is to prevent fluctuations in the output torque, which occur in the control process of reducing the speed of the first drive motor 140 to zero due to stopping of charging when the vehicle starts moving, from being transmitted to the driving shaft. In addition, the starting preparation control process may further include opening the engine clutch 130.

When the starting preparation is completed, the starting strategy determination unit 312 may select any one of a plurality of starting modes based on the torque requested by the driver, the maximum output torque of the second drive motor (171 or 172 depending on the configuration of the vehicle), and the state of the first drive motor 140. To this end, the starting strategy determination unit 312 determines the requested torque and the maximum output torque of the second drive motor 171 or 172 (S609), and compares the determined requested torque with the maximum output torque (S610). Here, the torque requested by the driver may be determined based on a creep torque and the value of an accelerator pedal position sensor (APS). In addition, the maximum output torque may be the maximum torque that can be currently output, i.e. the maximum available torque, taking into consideration the state (e.g. temperature) of the second driver motor 171 or 172 and the state of charge (SOC) of the battery.

The reason for comparing the requested torque with the maximum torque of the second drive motor 171 or 172 is as follows. As described above, since the second drive motor 171 is disposed so as to be connected to driving wheels other than the driving wheels to which the first drive motor 140 is connected or since the second drive motor 172 is implemented as an in-wheel motor, the second driver motor 171 or 172 may apply driving force to the vehicle independently of the first drive motor 140. Therefore, if the requested torque is completely satisfied using only the second drive motor 171 or 172, the first drive motor 140 is disconnected from the driving shaft corresponding thereto, and the requested torque is output using only the second drive motor 171 or 172. Thus, it is possible to commence movement of the vehicle without fluctuations in the output torque even before the speed of the first drive motor 140 is reduced to zero. This starting mode may be referred to as a "first EV mode".

Thus, when the maximum output torque of the second drive motor 171 or 172 is greater than the requested torque (Yes in S610), the starting strategy determination unit 312 determines the first EV mode as the starting mode, and transmits this determination to the starting controller 323 (i.e. an EV1 starting command). Thereafter, the starting controller 323 may output a torque command using the output torque of the second drive motor 171 or 172 as the requested torque (S620).

In contrast, when the maximum output torque of the second drive motor 171 or 172 is not greater than the requested torque (No in S610), the starting strategy determination unit 312 determines whether the speed of the first drive motor 140 has been reduced to zero (S611).

When the speed of the first drive motor 140 has been reduced to zero (Yes in S611), the starting strategy determination unit 312 selects a starting mode in which the first driver motor 140 and the second drive motor 171 or 172 share and output the requested torque (hereinafter referred to as "second EV mode"). On the other hand, when the speed of the first drive motor 140 has not been reduced to zero (No in S611), the starting strategy determination unit 312 selects a starting mode in which the clutch of the transmission is controlled to enter a slip mode and in which the engine 110 also shares a portion of the requested torque (hereinafter referred to as an "HEV mode"). The HEV mode is particularly advantageous when the driver intends to commence movement of the vehicle with a large output within a short time period after shifting to the D range.

When the second EV mode is selected, the starting strategy determination unit 312 transmits an EV2 starting command to the starting controller 323. Accordingly, the starting controller 323 controls the engine clutch 130 to enter an open state, and engages the clutch of the transmission 150 (S612).

In addition, the starting controller 323 may determine a torque-sharing rate of each of the first drive motor 140 and the second drive motor 171 or 172 (S613). For example, when the torque-sharing rate is $\alpha$ (where $0<\alpha<1$), the first drive motor 140 shares the requested torque at the rate of "$1-\alpha$", and the second drive motor 171 or 172 may share the requested torque at the rate of "$\alpha$". Here, in the case of an e4WD-type vehicle, the value of "$\alpha$" may correspond to a driving force sharing ratio of the front wheels to the rear wheels, without being limited thereto.

When the torque-sharing rate is determined, the starting controller 323 may output a torque command to each of the drive motors by applying the sharing rate of each of the drive motors to the requested torque (S614).

In contrast, when the speed of the first drive motor has not been reduced to zero (No in S611), the starting strategy determination unit 312 transmits an HEV starting command to the starting controller 323. Accordingly, the starting controller 323 starts the engine 110 (S615), and engages the engine clutch 130 (S616).

In addition, the starting controller 323 determines a torque-sharing rate $\alpha$ (where $0<\alpha<1$) for each driving source (S617) and controls the clutch of the transmission 150 to enter a slip state. At this time, the starting controller 323 also determines a torque transfer rate $\eta_{slip}$ of the clutch of the transmission 150 (S618). The torque transfer rate $\eta_{slip}$ may be 0 when the clutch of the transmission 150 is open, and may be 1 when the clutch of the transmission 150 is locked. At this time, since the engine clutch 130 is locked, the engine 110 and the first drive motor 140 rotate together and the torque values thereof are summed. Accordingly, the ratio of the requested torque shared by the first engine 110 and the first drive motor 140 to the requested torque shared by the second drive motor 171 or 172 is as follows:

$$\frac{(1-\alpha)}{\eta_{slip}} : \alpha.$$

The starting controller 323 may output a torque command to each of the driving sources 110, 140, 171 and 172 by applying the sharing rate of each of the driving sources to the requested torque (S619).

The above-described starting control process of step S610 and steps subsequent thereto may be repeatedly performed until the vehicle speed becomes equal to or greater than a predetermined value v (S621).

By performing charging while a vehicle is stopped and performing vehicle starting control according to forms of the present disclosure described above, it is possible to perform charging through a motor exhibiting high efficiency using the power of the engine while the vehicle is stopped and to determine a driving mode for commencing movement of the vehicle based on the requested torque and the state of the driving source when the vehicle starts moving, thereby securing both charging efficiency while the vehicle is stopped and drivability when the vehicle starts moving.

The present disclosure may be implemented as code that can be written on a computer-readable recording medium and thus read by a computer system. The computer-readable recording medium includes all kinds of recording devices in which data that may be read by a computer system are stored. Examples of the computer-readable recording medium include a Hard Disk Drive (HDD), a Solid-State Disk (SSD), a Silicon Disk Drive (SDD), a Read-Only Memory (ROM), a Random Access Memory (RAM), a Compact Disk ROM (CD-ROM), a magnetic tape, a floppy disc, and an optical data storage.

As is apparent from the above description, a hybrid electric vehicle according to at least one form of the present disclosure configured as described above may secure higher charging efficiency while a vehicle is stopped and drivability when the vehicle starts moving.

In particular, it is possible to perform charging through a motor exhibiting high efficiency using the power of the engine while the vehicle is stopped and to determine a driving mode for commencing movement of the vehicle based on the requested torque and the state of the driving source when the vehicle starts moving, thereby securing both charging efficiency while the vehicle is stopped and drivability when the vehicle starts moving.

However, the effects achievable through the disclosure are not limited to the above-mentioned effects, and other effects not mentioned herein will be clearly understood by those skilled in the art from the above description.

It will be apparent to those skilled in the art that various changes in form and details may be made without departing from the spirit and essential characteristics of the disclosure set forth herein. Accordingly, the above detailed description is not intended to be construed to limit the disclosure in all aspects and to be considered by way of example. The scope of the disclosure should be determined by reasonable interpretation of the appended claims and all equivalent modifications made without departing from the present disclosure should be included.

What is claimed is:

1. A method of controlling a hybrid electric vehicle, where the hybrid electric vehicle includes an engine and a first drive motor disposed on an input side of a transmission, and a second drive motor to apply a driving force independently of the first drive motor, the method comprising:
    performing, by a controller, charging through the first drive motor using power of the engine by engaging an engine clutch disposed between the engine and the first drive motor while the hybrid electric vehicle is stopped with a gear stage shifted to a parking (P) range;
    turning off, by the controller, the engine and controlling a clutch of the transmission to enter an open state when the gear stage is shifted to a driving (D) range; and
    commencing, by the controller, movement of the hybrid electric vehicle using the second drive motor alone or using the second drive motor and at least one of the first drive motor or the engine together based on at least one of a requested torque, an available torque of the second drive motor, or a speed of the first drive motor.

2. The method according to claim 1, wherein, when the available torque of the second drive motor is greater than the requested torque, commencing movement of the hybrid electric vehicle comprises outputting the requested torque by the second drive motor.

3. The method according to claim 1, wherein, when the available torque of the second drive motor is equal to or less than the requested torque, commencing movement of the hybrid electric vehicle comprises determining whether the first drive motor has been stopped.

4. The method according to claim 3, wherein, when the first drive motor has been stopped, commencing movement of the hybrid electric vehicle further comprises:
    opening the engine clutch and engaging the clutch of the transmission;
    determining a torque-sharing rate of each of the first drive motor and the second drive motor; and
    outputting, by each of the first drive motor and the second drive motor, a requested torque shared based on the torque-sharing rate.

5. The method according to claim 3, wherein, when the first drive motor has not been stopped, commencing movement of the hybrid electric vehicle further comprises:
    restarting the engine and engaging the engine clutch;
    determining a torque-sharing rate of the second drive motor;
    controlling the clutch of the transmission to enter a slip state and determining a torque transfer rate in the slip state; and
    determining, among the requested torque, a first torque to be shared by the engine and the first drive motor, and a second torque to be shared by the second drive motor based on the torque-sharing rate and the torque transfer rate.

6. The method according to claim 5, wherein a ratio of the first torque to the second torque is determined as $$\frac{(1-\alpha)}{\eta_{slip}}:\alpha,$$

where, $\eta_{slip}$ represents the torque transfer rate, and $\alpha$ represents the torque-sharing rate.

7. The method according to claim 1, wherein the controlling the clutch of the transmission to enter an open state comprises controlling the engine clutch to enter an open state.

8. The method according to claim 1, further comprising:
    determining, by the controller, whether charging is required,
    wherein the performing charging is performed when charging is required.

9. The method according to claim 1, further comprising:
    transmitting, by the first drive motor, a driving force to a first driving wheel; and
    transmitting, by the second drive motor, a driving force to a second driving wheel.

10. A non-transitory computer-readable recoding medium having a program recorded thereon, the program to direct a processor to perform acts of:
    performing, by a controller, charging through a first drive motor using power of an engine by engaging an engine clutch disposed between the engine and the first drive motor while a hybrid electric vehicle is stopped with a gear stage shifted to a parking (P) range;

turning off, by the controller, the engine and controlling a clutch of a transmission to enter an open state when the gear stage is shifted to a driving (D) range; and commencing, by the controller, movement of the hybrid electric vehicle using a second drive motor alone or using the second drive motor and at least one of the first drive motor or the engine together based on at least one of a requested torque, an available torque of the second drive motor, or a speed of the first drive motor.

11. A hybrid electric vehicle, comprising:

a transmission;

an engine and a first drive motor disposed on a input side of the transmission;

a second drive motor configured to apply a driving force independently of the first drive motor; and a controller configured to:
  perform charging through the first drive motor operated with power of the engine by engaging an engine clutch disposed between the engine and the first drive motor while the hybrid electric vehicle is stopped with a gear stage shifted to a parking (P) range,
  turn off the engine and control a clutch of the transmission to enter an open state when the gear stage is shifted to a driving (D) range, and commence movement of the hybrid electric vehicle using the second drive motor alone or using the second drive motor and at least one of the first drive motor or the engine together based on at least one of a requested torque, an available torque of the second drive motor, or a speed of the first drive motor.

12. The hybrid electric vehicle according to claim 11, wherein, when the available torque of the second drive motor is greater than the requested torque, the controller is configured to control the second drive motor to output the requested torque.

13. The hybrid electric vehicle according to claim 11, wherein, when the available torque of the second drive motor is equal to or less than the requested torque, the controller is configured to determine whether the first drive motor has been stopped.

14. The hybrid electric vehicle according to claim 13, wherein, when the first drive motor has been stopped, the controller is configured to:
  open the engine clutch,
  engage the clutch of the transmission,
  determine a torque-sharing rate of each of the first drive motor and the second drive motor, and
  control the first drive motor and the second drive motor to respectively output a requested torque shared based on the torque-sharing rate.

15. The hybrid electric vehicle according to claim 13, wherein, when the first drive motor has not been stopped, the controller is configured to:
  restart the engine,
  engage the engine clutch,
  determine a torque-sharing rate of the second drive motor,
  control the clutch of the transmission to enter a slip state,
  determine a torque transfer rate in the slip state, and
  determine, among the requested torque, a first torque to be shared by the engine and the first drive motor, and a second torque to be shared by the second drive motor based on the torque-sharing rate and the torque transfer rate.

16. The hybrid electric vehicle according to claim 15, wherein a ratio of the first torque to the second torque is determined as $$\frac{(1-\alpha)}{\eta_{slip}} : \alpha,$$

where, $\eta_{slip}$ represents the torque transfer rate, and $\alpha$ represents the torque-sharing rate.

17. The hybrid electric vehicle according to claim 11, wherein the controller is configured to control the engine clutch to enter an open state when the gear stage is shifted to the driving (D) range.

18. The hybrid electric vehicle according to claim 11, wherein the controller is configured to determine whether charging is required, and perform a control for the charging when the charging is required.

19. The hybrid electric vehicle according to claim 11, wherein the first drive motor is configured to transmit a driving force to a first driving wheel, whereas the second drive motor is configured to transmit a driving force to a second driving wheel.

20. The hybrid electric vehicle according to claim 11, wherein the first drive motor is configured to transmit a driving force to a first driving wheel, and the second drive motor is disposed in the first driving wheel in a form of an in-wheel motor.

\* \* \* \* \*